United States Patent
Wells

(10) Patent No.: US 7,116,828 B2
(45) Date of Patent: Oct. 3, 2006

(54) INTEGRATED VIDEO DECODING SYSTEM WITH SPATIAL/TEMPORAL VIDEO PROCESSING

(75) Inventor: Aaron Wells, Oakland, CA (US)

(73) Assignee: LSI Logic Corporation, Milpitas, CA (US)

( * ) Notice: Subject to any disclaimer, the term of this patent is extended or adjusted under 35 U.S.C. 154(b) by 804 days.

(21) Appl. No.: 10/364,836

(22) Filed: Feb. 10, 2003

(65) Prior Publication Data
US 2004/0057624 A1   Mar. 25, 2004

Related U.S. Application Data

(63) Continuation-in-part of application No. 10/256,190, filed on Sep. 25, 2002, now Pat. No. 7,068,722.

(51) Int. Cl.
*G06K 9/36* (2006.01)
*G06K 9/40* (2006.01)
*G06K 9/54* (2006.01)

(52) U.S. Cl. .................... 382/233; 382/260
(58) Field of Classification Search ........... 382/224, 382/232, 233, 236, 239, 240, 260, 276, 277, 382/305; 348/448; 341/94; 375/240.01, 375/240.15, 240.16, 240.25, 240.26, 240.27, 375/240.29
See application file for complete search history.

(56) References Cited

U.S. PATENT DOCUMENTS

| | | | | |
|---|---|---|---|---|
| 6,462,791 | B1* | 10/2002 | Zhu | 375/240.27 |
| 6,466,624 | B1* | 10/2002 | Fogg | 375/240.27 |
| 6,542,196 | B1* | 4/2003 | Watkins | 348/448 |
| 6,909,745 | B1* | 6/2005 | Puri et al. | 375/240.01 |
| 6,970,206 | B1* | 11/2005 | Swan et al. | 348/448 |
| 2004/0057517 | A1* | 3/2004 | Wells | 375/240.16 |
| 2004/0057624 | A1* | 3/2004 | Wells | 382/233 |
| 2005/0206785 | A1* | 9/2005 | Swan et al. | 348/448 |

* cited by examiner

*Primary Examiner*—Amir Alavi
(74) *Attorney, Agent, or Firm*—Strategic Patent Group Inc.

(57) ABSTRACT

An integrated video decoding system with spatial/temporal video post-processing is disclosed. The integrated video decoding system includes a video decoder for decompressing an input data stream, and an integrated post-processing stage coupled to the video decoder. According to one aspect of the present invention, the integrated post-processing stage combines a temporal filter, a de-interlacer, and optionally a deblocking filter. The integrated post-processing stage further utilizes a single memory system used by the temporal filter and the de-interlacer.

31 Claims, 8 Drawing Sheets

INTEGRATED VIDEO DECODING SYSTEM WITH SPATIAL/TEMPORAL VIDEO PROCESSING

CROSS-REFERENCE TO RELATED APPLICATION

This application is a continuation-in-part of application Ser. No. 10/256,190 now U.S. Pat. No. 7,068,722 entitled "CONTENT ADAPTIVE VIDEO PROCESSOR USING MOTION COMPENSATION" filed on Sep. 25, 2002, and herein incorporated by reference in its entirety.

FIELD OF THE INVENTION

The present invention relates to video compression and decompression methods, and more particularly to an integrated video decoding system having spatial/temporal video processing.

BACKGROUND

Digital video and digital video compression has become ubiquitous throughout the content generation, distribution, broadcast, editing, and storage markets. In general, image sequences may be compressed as either spatial only (JPEG, DV, MPEG Intra pictures) or both temporally and spatially (MPEG, H.261, H.263, H.264). The dominant compression schemes are block-based (MPEG2, MPEG1, DV, MPEG4) and 'lossy'.

A compressed video stream is an encoded sequence of video frames. Each frame is a still image. A video player displays one frame after another, usually at a rate close to 30 frames per second. Frames can be encoded in three types: intra-frames (I-frames), forward predicted frames (P-frames), and bi-directional predicted frames (B-frames). Non-intra frames are encoded using information from outside the current frames that has already been encoded. There are two types of non-intra frames, predicted frames (P-frames) and bidirectional frames (B-frames). In non-intra frames, motion compensated information is used for a macroblock, which results in less data than directly (intra) encoding the macroblock.

An I-frame is spatially encoded as a single image, with no reference to any past or future frames. After the I-frame has been processed, the encoded frame will be transmitted to a decoder, where it is decoded as a reconstructed image and stored. The encoded I-frame is also decoded at the encoder to provide a reconstructed version of the image identical with the one that will be generated by the decoder. This reconstructed image is used as a reference frame to encode non-intra frames.

A P-frame is encoded relative to the past reference frame, which can be an I- or P-frame. The past reference frame is the closest preceding reference frame. Before the image is transformed from the spatial domain into a frequency domain using the DCT (Discrete Cosine Transform), each macroblock is compared with the same block in the reference image. If the block is part of a static background, it will be the same as the corresponding block in the reference image. Instead of encoding this block, the decoder is instructed to use the corresponding block from the reference image. If the block is part of motion in the scene, then the block may still be present in the reference image, just not in the same location. A motion vector is used to instruct the encoder where in the reference image to get the data, typically using a value having x and y components. The process of obtaining the motion vector is known as motion estimation, and using the motion vector to eliminate or reduce the amount of residual information to encode is known as motion compensation. The encoding for B-frames is similar to P-frames, except that motion vectors may refer to areas in both past and future reference pictures.

Once the compressed video stream is received by a decoder (e.g., MPEG or DV), the decoder decompresses the video and performs a scaling operation and perhaps overlays graphics ('sub-picture' in DVD-Video) prior to display. Newer compression schemes such as MPEG4, H.26L, and H.263+, as well as older, low bit rate standards such as H.261 also apply deblocking filters to reduce the effects of the DCT block boundary artifacts (Note that not all block-based standards use DCT). Progressive output (also known as 'line doubling' or 'de-interlacing') delivers higher vertical resolution and is typically generated by a pixel-adaptive nonlinear filter applied between fields to generate interpolated pixels. Large screen televisions employ special purpose hardware to detect coherent pan sequences in NTSC film material, and generate interpolated frames to reduce the motion artifacts of 3:2 pulldown ('Judder').

The decode process typically is performed in raster order left to right and top to bottom, although this need not be the case (example: DV). Additionally, some coding schemes may decode multiple pictures simultaneously. In the decode process, the reconstructed pixel data is created in an on-chip memory system and written back out to external memory (e.g., SDRAM). Previously decoded images may be accessed to provide reference pixel information used in the reconstruction of predicted images. The fetching and storage of pixel information consumes SDRAM 'bandwidth' and can be the bottleneck to system performance. Providing higher bandwidth to memory typically increases system cost, either in the form of a 'wider' memory interface (e.g., 32 bit instead of 16 bit wide memory) or in the form of faster memories (more power consumption, typically more expensive). In integrated system-on-chip video codec solutions, especially those with a Unified Memory Architecture (UMA), SDRAM bandwidth is one of the critical resources limiting system performance.

Co-pending patent application Ser. No. 10/256,190, discloses a content adaptive video processor in which scene classification is used to supply control input to a temporal filter to modify the behavior of the temporal filter according to current characteristics of the content to more effectively reduce artifacts in the image sequence. In addition, the temporal filtering may be applied in the encoding system and/or the decoding system, and in or out of the encoding and decoding loops. In this system, a motion estimation unit is utilized by both a motion-compensated temporal filter (MCTF) and a motion-compensated de-interlacer (MCDI).

Motion estimation tasks, however, require memory space for reference and target images, SDRAM bandwidth to fetch the pixels from these images, and computational resources to perform pixel comparisons and compute candidate motion vectors. In hierarchical motion estimation schemes, decimated (reduced resolution) versions of the reference and target images must be generated as well prior to performing motion estimation.

Typically, there is a pipelined architecture for performing both the MCTF and MCDI processes that includes the following three steps. The first step generates decimated images for the motion estimation engine; performs temporal analysis to detect repeated fields (for film material) and to detect scene cuts; measures spatial analysis metrics across the images to detect the location and severity of macroblocking, localized frequency content, edges and other features; and measures image differences and picture-level metrics to identify scene cuts, classify scenes, and invoking specialized processing modes for the identified scene type. (e.g., recognize film content for MCDI).

The second step is to perform motion estimation (ME). Typically, several stages of ME (e.g., hierarchical or telescopic motion estimation) may occur in sequence, each using the results from the previous stage. Additionally, multi-candidate ME may add stages, using different hierarchies or target blocks (e.g., field and frame).

The third step is to perform either MCTF or MCDI, respectively, in which the ME vector candidates are evaluated, block mode selected, and the temporal filtering and de-interlacing steps are performed using the information from the previous stages.

In a non-integrated system, (such as might occur in a system with both a decoder and de-interlacing chip) these three steps occur separately for MCTF and MCDI, and SDRAM space, SDRAM bandwidth, decimation, and estimation effort is duplicated. Additionally, image fetches and processing for spatial analysis and scene classification (e.g., to detect scene changes) is duplicated as well.

Accordingly, what is needed is an improved video decoder system. The present invention addresses such a need.

SUMMARY OF THE INVENTION

The present invention provides an integrated video decoding system with spatial/temporal video post-processing. The integrated video decoding system includes a video decoder for decompressing an input data stream, and an integrated post-processing stage coupled to the video decoder. According to one aspect of the present invention, the integrated post-processing stage combines a temporal filter, a deinterlacer, and optionally a deblocking filter. The integrated post-processing stage further utilizes a single memory system used by the temporal filter and the de-interlacer.

According to the system disclosed herein, combining MCTF (motion compensated temporal filtering) and MCDI (motion compensated de-interlacing) into a single stage along with the use of only one memory system requires only a single set computations, instead of computations for each stage, and requires only one set of stored reference and target images, thereby reducing the total associated SDRAM bandwidth consumption.

DETAILED DESCRIPTION

The present invention relates to video processing techniques. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown but is to be accorded the widest scope consistent with the principles and features described herein.

Figure 1:
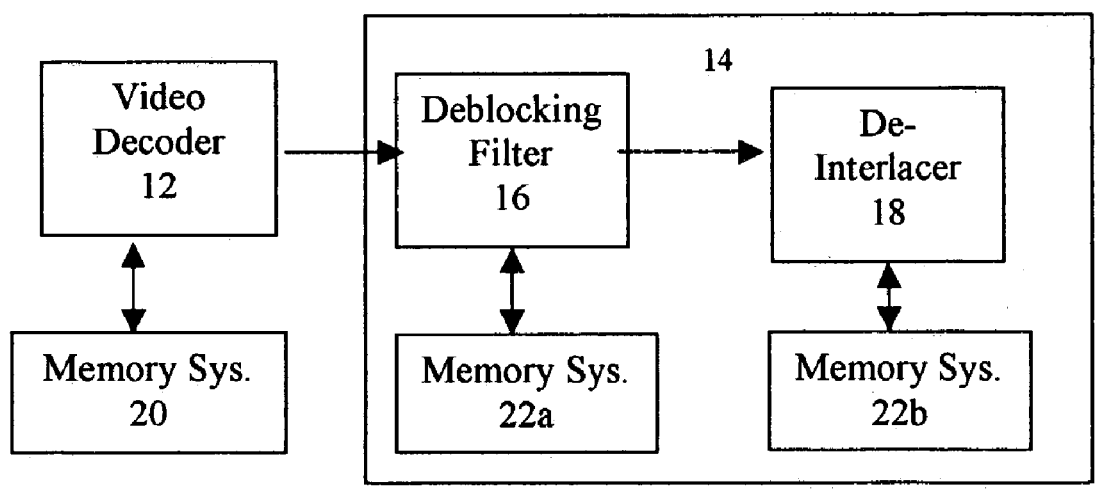
FIG. 1 is a block diagram illustrating a conventional decoding system

FIG. 1 is a block diagram illustrating a conventional decoding system 10, with debocking and de-interlacing added in an external device. Such a system 10 typically includes a video decoder 12 followed by a separate post processor stage 14 that includes a deblocking filter 16 and a de-interlacer 18.

The video decoder 12 uses an external memory 20 (typically SDRAM). The post processor stage 14 uses at least one memory system that is separate from the video decoder 12, but typically includes two separate memory systems 22a and 22b for the deblocking filter 16 and the de-interlacer 18, respectively. The decoding system 10 may also include an optional motion estimator (not shown) for performing motion compensated de-interlacing (MCDI).

In operation, the video decoder 12 receives a compressed data stream and produces a sequence of reconstructed output images in either decode or display order, and stores the output images in the external memory 20. The reconstructed output images are then transferred to the post-processing stage 14 where the deblocking 16 and de-interlacing 18 operations occur.

Figure 2:
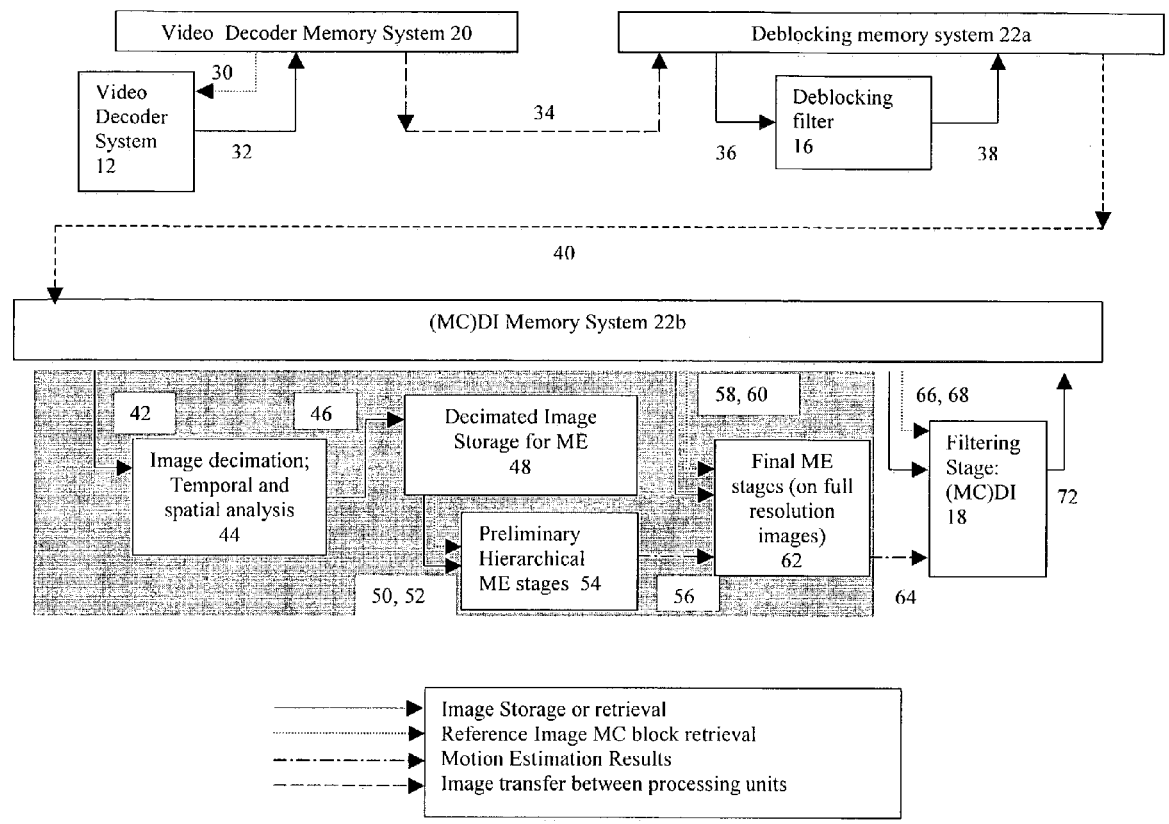
FIG. 2 is a flow diagram illustrating the process for storing and retrieving images performed by the decoding system of FIG. 1.

FIG. 2 is a flow diagram illustrating the process for storing and retrieving images performed by the decoding system 10 of FIG. 1. Assuming that MCDI is used, the video decoder 12 first retrieves reference image MC blocks from the external memory system 20 via line 32, and stores reconstructed images back into the external memory system 20 via line 30. The reconstructed output images are then transferred to the deblocking memory 22a via line 34. The deblocking filter 16 retrieves the images via line 36, performs the deblocking operation, and writes the deblocked images back to the deblocking memory system 22a via line 38.

The deblocked images are then transferred to the de-interlacing memory 22b via line 40. Assuming motion-compensated de-interlacing is implemented, then the data fetches shown in the shaded area must be performed as follows. First, reference image MC blocks are retrieved from the de-interlacing memory 22b via line 42, and the images are decimated, and temporal and spatial analysis are performed in block 44. The decimated images are transferred to motion estimation (ME) storage 48 via line 46. In a preferred embodiment, the decimated image storage 48 is typically within the same SDRAM chip as the image memory system 22b, although it is depicted in the Figures as a different system. The decimated images and reference image MC blocks are retrieved via lines 50 and 52, and preliminary hierarchical ME stages are performed in block 54. The motion estimation result 56 is input the final ME stage 62, which is performed on the full resolution deblocked images and MC blocks that are retrieved via lines 58 and 60. Although a direct transmission of ME vector results 56 are shown in the Figures directly input to the final ME stage 62, in general the ME vector results 56 could be stored in SDRAM 22b and then fetched by the final ME stage 62. This is in implementation detail, and the burden on the system is inconsequential compared with image fetches.

Finally, the motion estimation results 64 are input to the MC de-interlacer 18 for de-interlacing of the deblocked images and the MC blocks, which must first be retrieved from the de-interlacing memory 22b via lines 66 and 68. The de-interlaced images are written back via line 72.

In such a non-integrated system (such as might occur in a system with both a decoder and de-interlacing chip) image search and retrievals occur separately for the deblocking, motion estimation, and de-interlacing steps, wasting SDRAM bandwidth.

Figure 3:
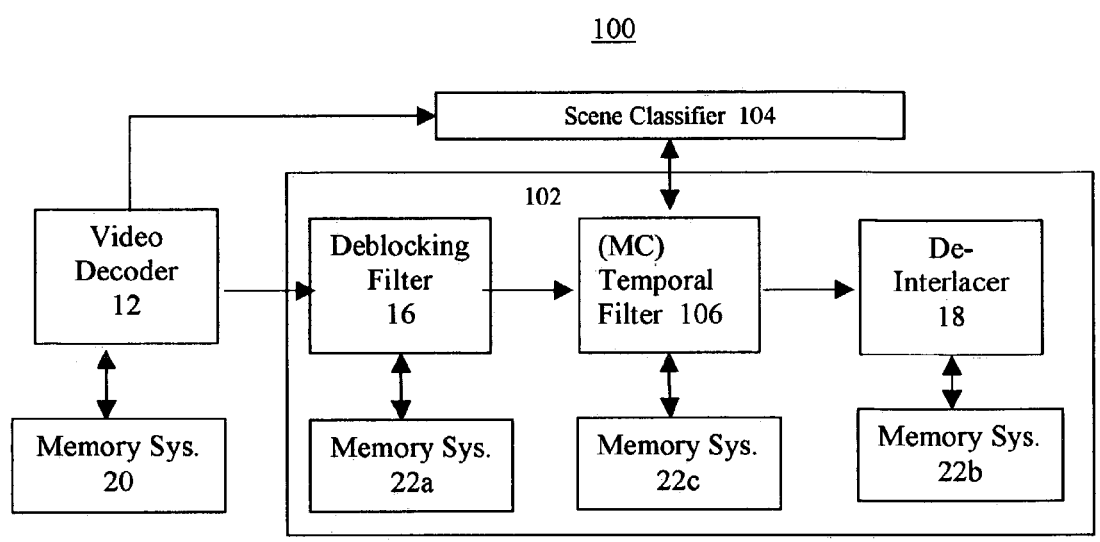
FIG. 3 is a diagram illustrating an improved decoding system.

FIG. 3 is a diagram illustrating an improved decoding system, where like components from FIG. 1 are shown with like reference numerals. The decoder system 100 is similar to the non-integrated decoding system 10 of FIG. 1, but further includes a scene classifier 104 and an adaptive temporal filter 106 added to the post processing stage 102. The temporal filter 106 utilizes an additional memory system 22c. The term "(MC)" in the FIG. 3 implies optional motion compensation in the corresponding processing block, which is provided by a motion estimation (ME) process (not shown).

The scene classifier 104 classifies the scene from the data stream, analyzes it's content, and applies a set of rules to the results of the classification and the content analysis to adapt the characteristics of the temporal loop filter 106. For example, one primary function of the scene classifier is to detect scene changes in the data stream and adapt the strength of the temporal filter accordingly. Any or all filters, however, may be adjusted in response to the control input of the scene classifier 104.

Figure 4:
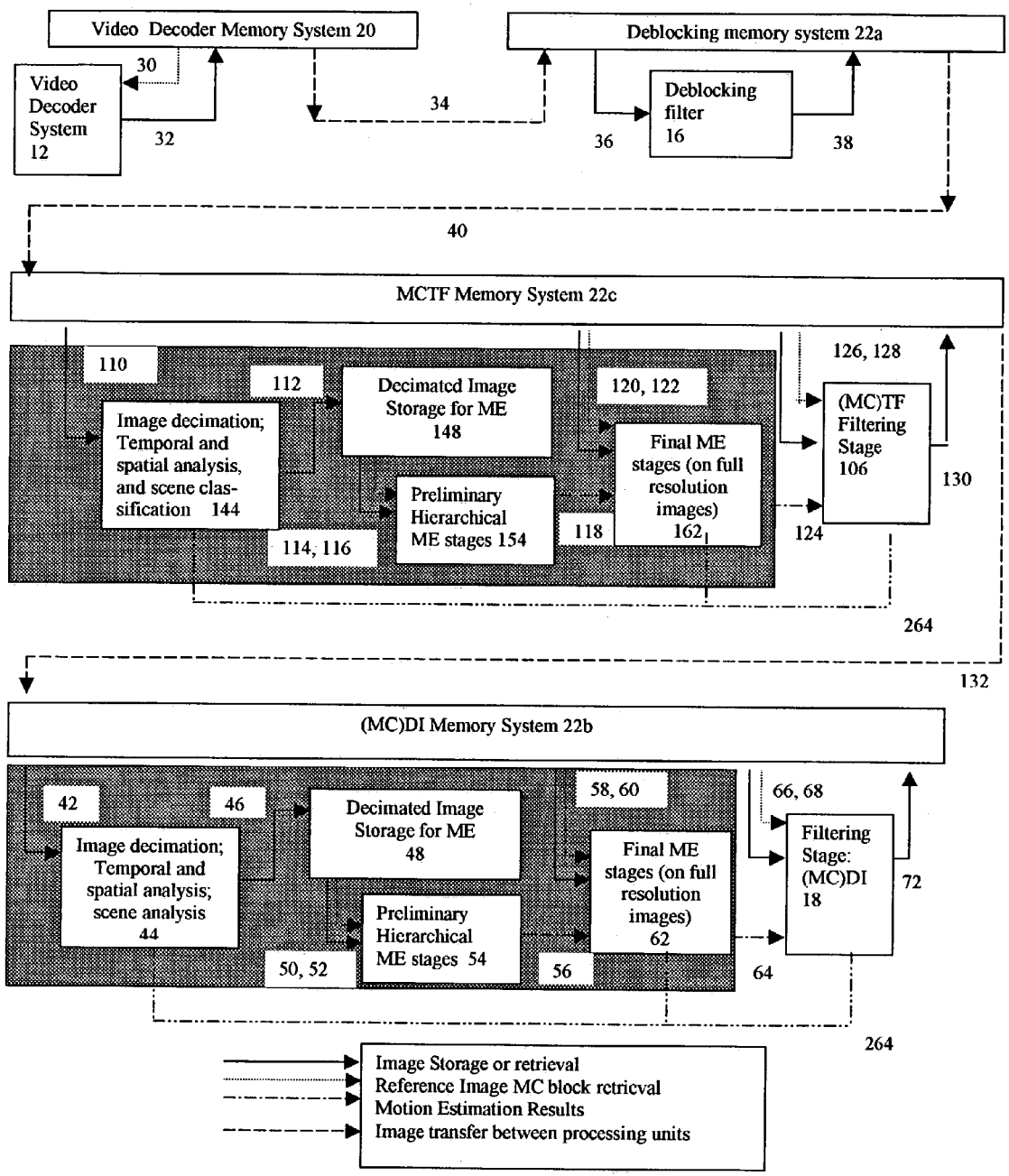
FIG. 4 is a flow diagram illustrating the process for storing and retrieving images performed by the decoding system of FIG. 3

FIG. 4 is a flow diagram illustrating the process for storing and retrieving images performed by the decoding system 100 of FIG. 3, where like components have like reference numerals. The shaded area is specific to motion compensation; these processing blocks and data fetches are omitted for the non-motion compensated temporal filtering and de-interlacing cases.

The decoding system 100 performs video decoding and deblocking as described in FIG. 1. After deblocking 16, the deblocked images are then transferred to the temporal filter memory system 22c via line 40. Assuming motion-compensation is implemented, then the data fetches shown in the shaded area must be performed as follows. First, reference image MC blocks are retrieved from the temporal filter memory system 22c via line 110, and the images are decimated, and temporal and spatial analysis are performed in block 144. The decimated images are then transferred, to motion estimation (ME) storage 148 via line 112. The decimated images and reference image MC blocks are retrieved via lines 114 and 116, and preliminary hierarchical ME stages are performed in block 154. The motion estimation result 118 is input the final ME stage 162, which is performed on the full resolution deblocked images and MC blocks that are retrieved via lines 120 and 122. Finally, the motion estimation results 124 are input to the MC temporal filtering stage 106 for temporal filtering of the deblocked images and the MC blocks, which must first be retrieved from the deinterlacing memory 22b via lines 126 and 128. The temporally filtered images are written back via line 130. The process then proceeds with MCDI using the (MC)DI Memory System 22b, as described with reference to FIG. 2.

Although the non-integrated system 110 results in improved image quality over the system 10 due the adaptive temporal filter, image search and retrievals occur separately for the deblocking filter 16, the temporal filter 106, and the de-interlacer 18, resulting in duplication of SDRAM space and bandwidth. In addition, if motion compensation is employed, both decimation and motion estimation processes are duplicated by the temporal filter 106 and the di-interlacer 18.

According to the present invention, the following functions are integrated into a single post processing stage: deblocking, scene classification (including scene change detection), temporal filtering (MC or no MC), and de-interlacing to save system cost and processing latency. The present invention also employs block-based motion estimation and compensation techniques to the post-decode video processing step using a single motion compensation stage, to provide improved video quality.

More specifically, the present invention combines the separate steps of deblocking (block noise reduction), MCTF, and MCDI into a single stage in a postprocessor. The motion vector, scene cut, and scene classification information is shared by all post processing tasks, but each may react differently to this information. The third step is optionally combined or separate. Inasmuch as the filtering tasks are different, the pixel processing at this stage is not combined. However, the filtering stage can combine the image fetch and pipeline the filtering operations internally to eliminate multiple image fetch/store iterations. An example set of operations is as follows: 1) fetch a region of the target and MCTF reference data, 2) perform MCTF function, 3) perform block noise reduction and fetch MCDI reference data, 4) perform MCDI, 5) store post-processed macroblock.

In a further aspect of the present invention, the post-processing stage further integrates format conversion and scaling functions to convert "525/50" standard images (NTSC) to "625/50" standard images (PAL), and vice versa. Note that single fields of video can be dropped and top fields converted to bottom fields (and vice versa) by moving the display up or down one line. PAL/NTSC conversion may be known, but the integration into this single post-processing stage improves system efficiency. Also, it is better done after MCTF and MCDI, as opposed to within the decoder 12.

Figure 5:
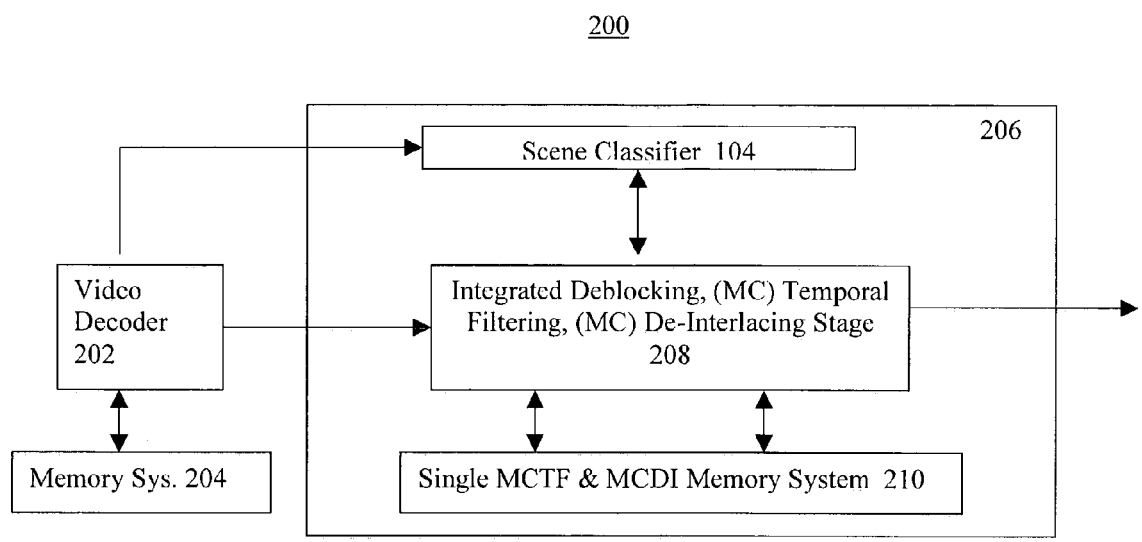
FIG. 5 is a diagram illustrating one embodiment of an integrated decoding system of the present invention.

FIG. 5 is a diagram illustrating one embodiment of an integrated decoding system of the present invention. The first embodiment of the integrated decoding system 200 includes a non-integrated decoder 202 coupled to an integrated post-processing stage 206. As in the prior systems, the video decoder 202 uses an external memory system 204. However, in contrast to the decoding system 100 of FIG. 3, the post-processing stage 206 comprises an integrated deblocking, temporal filtering, and de-interlacing stage 208, and a single memory system 210 that is shared by all three processes. In a further aspect of this embodiment, the integrated post-processing stage 206 includes a scene classifier 104 that sends control information to the (MC)TF, as described above. Note that temporal filtering is optionally motion-compensated using a single motion block-based estimation process (not shown) that is used to provide motion compensated (MC) temporal filtering and MC de-interlacing.

Figure 6:
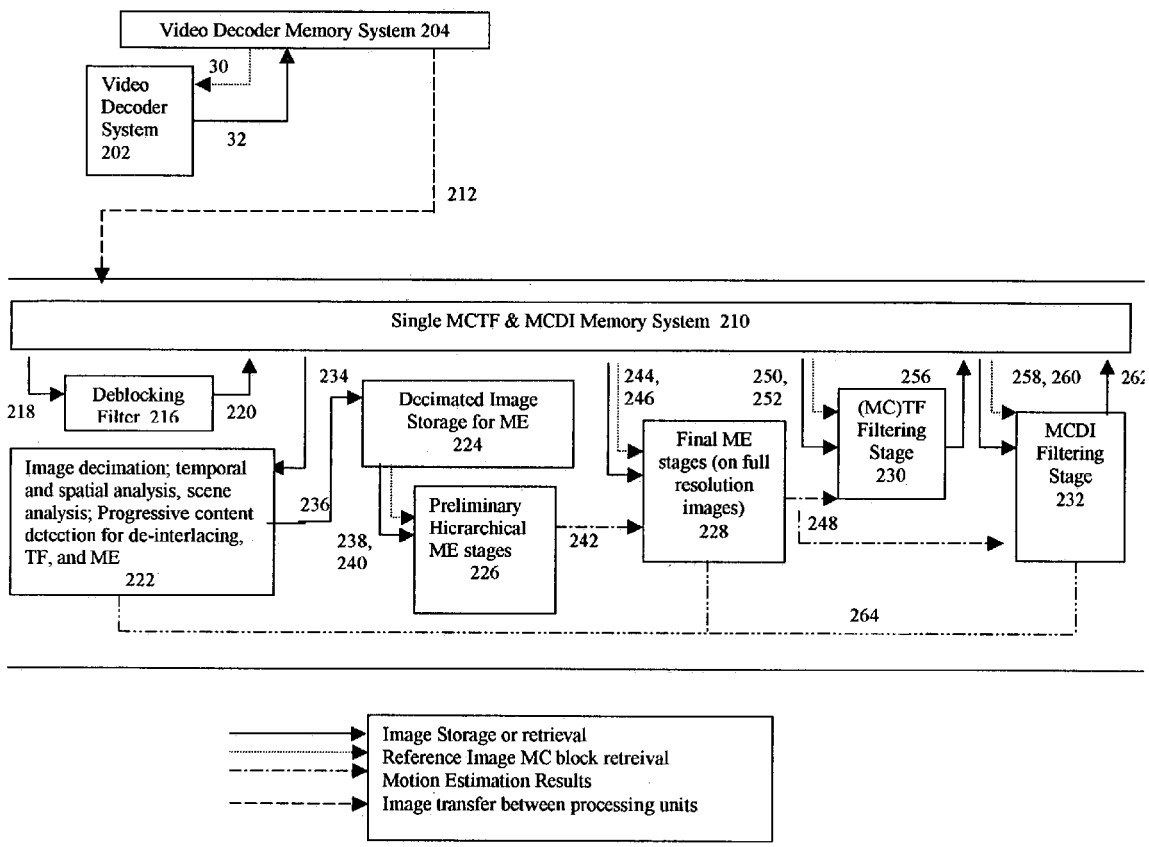
FIG. 6 is a flow diagram illustrating the process for storing and retrieving images performed by the decoding system.

FIG. 6 is a flow diagram illustrating the process for storing and retrieving images performed by the decoding system 200. The decoding system 200 performs video decoding using video decoder 202, as described in FIG. 1. After video decoding, the images are transferred to the single MCTF & MCDI memory system 210 via line 212. The images are input to the deblocking filter 216 via line 218, and the deblocked images are written back to the memory system 210 via line 220. In an alternative embodiment, the deblocker 216 can go either in the decoder 202 or in the external post-processor chip 206. When put in to the decoder 202, which requires a more expensive and capable decoder, information in the compressed bitstream itself can be used to improve deblocking. This information includes items such as quantization step size, block coding type, picture type, bit rate, and motion vector field. Also, for a solution with a separate decoder and post-processor chip, the decoder 202 may send a scaled output to the post-processor 206, typically 720 pixels wide. If the video were compressed at 480 wide, the blocks to the post-processor are no longer 16 pixels wide but would be expanded to 24 pixels.

Reference image MC blocks are retrieved from the memory system 210 via line 234, the images are decimated, and then temporal and spatial analysis are performed on the decimated images in block 222. Progressive content detection for de-interlacing, TF, and ME is also performed by block 222. As shown by dotted line 264, the scene classifier 104 is further coupled to the final ME stage 228 and the de-interlacer 232. Progressive or static content, includes video content where there is no motion between the top and bottom video fields of the frame. The most common instance of this type of frame. The most common instance of this type of material is for movies (which are shot on film) and transferred to video. But not all progressive content comes from film: there are progressive video cameras, computer generated material, and just still pictures, such as during the "FBI Warning" at the beginning of a DVD. The key to de-interlacing is that these scenes have to be detected (no content is guaranteed movie, video, progressive, or static for very long) and the de-interlacing technique has to adjust picture by picture.

The decimated images are then transferred to motion estimation (ME) storage 224 via line 236. The decimated images and reference image MC blocks are retrieved via lines 238 and 226, and preliminary hierarchical ME stages are performed in block 226. The motion estimation result 242 is input to the final ME stage 228, which is performed on the full resolution deblocked images and MC blocks that are retrieved via lines 244 and 246. The final motion estimation results 248 are input to the MC temporal filtering stage 230 for temporal filtering of the deblocked images and the MC blocks, which must first be retrieved from the memory system 210 via lines 250 and 252. The temporally filtered images are written back via line 256. Finally, the motion estimation results 248 are input to the MC de-interlacing filtering stage 232 for de-interlacing of the temporally filtered images and the MC blocks, which must first be retrieved from the single memory system 210 via lines 258 and 260. Finally, the de-interlaced images are then written back to the single memory 210 via line 262. Note, 256 and 258 can be combined, and 252 and 260 could be further combined in different embodiments.

According to the present invention, the combination of the integrated deblocking, temporal filtering and de-interlacing stage 208 and the single memory system 210, significantly reduces system latency, computational effort, memory size, memory bandwidth, and system cost compared to the non-integrated solutions.

Figure 7:
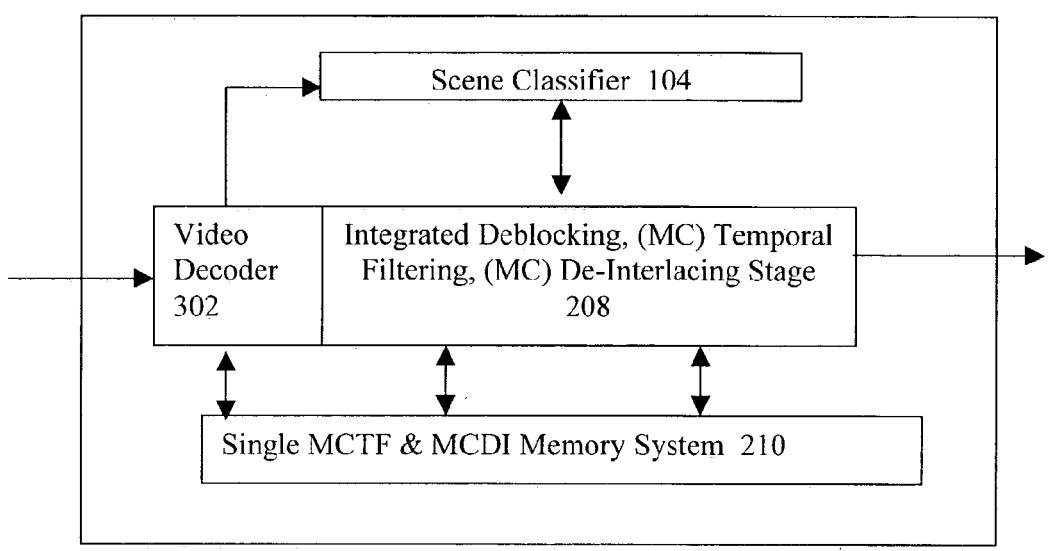
FIG. 7 is a diagram illustrating a second embodiment for the integrated decoding system of the present invention.

FIG. 7 is a diagram illustrating a second embodiment for the integrated decoding system of the present invention, where like components from FIG. 5 are shown with like reference numerals. In this second embodiment, a fully integrated decoding system 300 includes both an video decoder 302 and an integrated post-processing stage 208 together with a single memory system 210 for image storage. The video decoder 302 and all three processes of the post-processing stage 208 share the single memory system 210. The integrated decoding system 300 includes a scene classifier 104 that sends control information to the (MC)TF and MCDI, as described above. Note that temporal filtering is optionally motion-compensated using a single motion block-based estimation process (not shown) that is used to provide motion compensated (MC) temporal filtering and MC de-interlacing.

Figure 8:
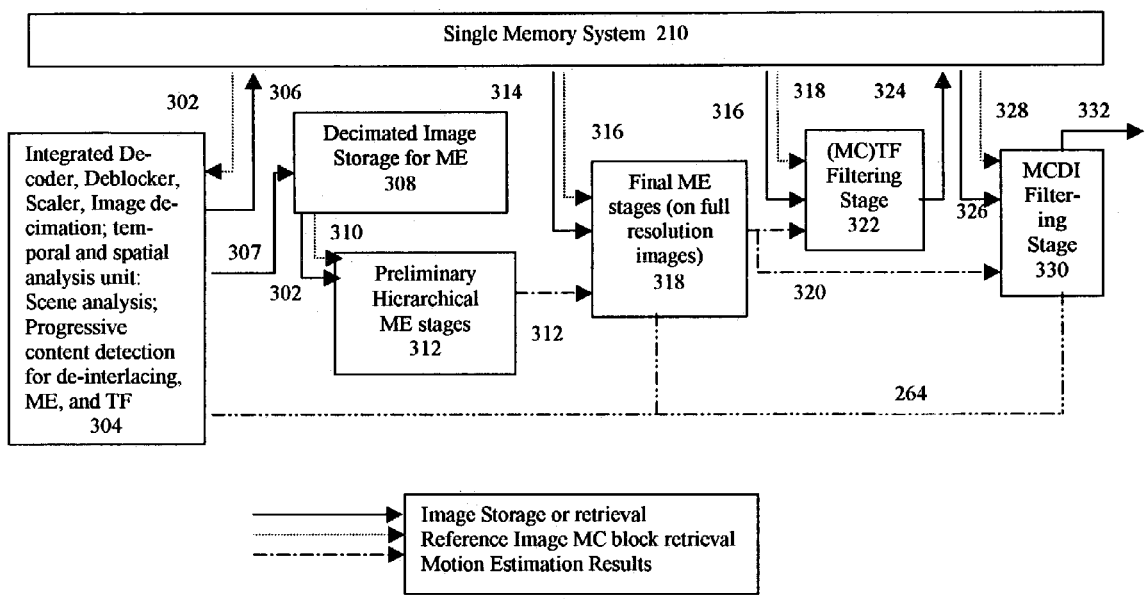
FIG. 8 is a flow diagram illustrating the process for storing and retrieving images performed by the Integrated video decoder and post-processing system

FIG. 8 is a flow diagram illustrating the process for storing and retrieving images performed by the integrated decoding 300. The process begins with an integrated process 304 that first retrieves reference image MC blocks from the single memory system 210 via line 302, and then decodes, deblocks, scales, decimates and performs spatial analysis on the images. The process 304 also performs progressive content detection for motion estimation, temporal filtering, and de-interlacing. After processing, the images are then written back to the memory system 210 via line 306.

Processing then continues as described with reference to FIG. 6. The decimated images are transferred to motion estimation (ME) storage 308 via line 307. The decimated images and reference image MC blocks are retrieved via lines 302 and 310, and preliminary hierarchical ME stages are performed in block 312. The motion estimation result 312 is input the final ME stage 318, which is performed on the full resolution deblocked images and MC blocks that are retrieved via lines 314 and 316. The motion estimation results 320 are input to the MC temporal filtering stage 322 for temporal filtering of the deblocked images and the MC blocks, which must first be retrieved from the memory system 210 via lines 316 and 318. The temporally filtered images are written back via line 324. Finally, the motion estimation results 320 are input to the MC de-interlacing filtering stage 330 for de-interlacing of the temporally filtered and the MC blocks, which must first be retrieved from the single memory 210 via lines 326 and 328.

In one embodiment, the motion-compensated de-interlacing filtering stage is performed in the video display channel, such that the de-interlaced images are simply output via line 332, rather than being written back to the single memory 210, thereby saving space and bandwidth. This is not necessarily preferred, however, since the display channel becomes more complex, and quality short cuts would probably be taken for this case, but this solution reduces costs.

In a further aspect of the present invention, aspect ratio conversion may also be performed during the de-interlacing filtering stage, such as for vertical scaling of the image when converting from the "525/50" standard (NTSC) to the "625/50" standard (PAL), and vice versa. NTSC frames are 29.97 frames/sec and are 480 active (viewable) pixels high (525 total). PAL frame are 25 frames/sec and are 576 active (viewable) pixels high (625 total). For this conversion, we need, at a minimum to drop or repeat fields or frames to convert the frame rate and to stretch or shrink the images vertically.

The aspect ratio conversion could go up to a high-definition (HD) standard from standard definition (SD), such as from 480i to 480P with the de-interlacing in the same stage all the way up to 720P or 1080i. Alternatively, this last step from 480P to 720P or 1080i could occur in the display channel. The benefit of doing the last step up to HD resolution in the display channel is that the SDRAM never contains large HD-sized pictures and consequently SDRAM size and bandwidth are minimized while high-quality up-conversion is still delivered.

According to this second embodiment of the integrated decoding system 300, integrating the post-processing stage 208 with the video decoder system 302 results in even more savings in system latency and computational effort, memory size, memory bandwidth, and system cost.

The integrated decoding system 300 may further be optimized. Depending on data format in memory, an "interlaced" copy of the data may be required in addition to the "progressive" output of MCDI 330. The optimization to make the write-back of MCTF data via line 324 optional, storing the "current" fetch to MCTF stage 322 on-chip, and then inputting it directly to the MCDI filtering stage 330. Thus, the system 300 can eliminate this write-back 324 and make use of just the MCDI output 332.

According to further aspect of the present invention, in an MPEG or H.26L encoder/decoder system, the same motion estimation system may be used for both decoder post-processing and encoder motion vector estimation.

An integrated video decoding system with spatial/temporal video post-processing has been disclosed. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A video decoding system, comprising:
   a video decoder for decompressing an input data stream;
   an integrated post-processing stage coupled to the video decoder, the integrated post-processing stage comprising,
      a temporal filter; and a de-interlacer; and
      a single memory system used by the temporal filter and the de-interlacer.

2. The system of claim 1 wherein the integrated post-processing stage further includes a deblocking filter.

3. The system of claim 2 further including a scene classifier coupled to the temporal filter for detecting scene changes and adapting strength of the temporal filter accordingly.

4. The system of claim 3 wherein the integrated post-processor further includes a single motion compensation stage such that the temporal filter and the de-interlacer utilize motion compensation.

5. The system of claim 4 wherein the video decoder uses an external memory system.

6. The system of claim 5 wherein the video decoder retrieves reference image MC blocks from the external memory system, stores reconstructed images back into the external memory system, and the reconstructed images are then transferred to the single memory system.

7. The system of claim 6 wherein the post-processing stage retrieves reference image motion compensated blocks from the single memory system wherein the images are decimated, creating decimated images, and then temporal and spatial analysis are performed on the decimated images.

8. The system of claim 7 wherein progressive content detection for deinterlacing, temporal filtering, and motion estimation are further performed on the decimated images.

9. The system of claim 8 wherein the decimated images are then transferred to a motion estimation storage.

10. The system of claim 9 wherein the decimated images and reference image motion compensated blocks are retrieved from the motion estimation storage for preliminary hierarchical motion estimation.

11. The system of claim 10 wherein a final motion estimation stage performs final motion estimation using deblocked images and motion compensated blocks retrieved from the single memory system, and motion estimation results received from the preliminary hierarchical motion estimation.

12. The system of claim 11 wherein the temporal filter performs temporal filtering using the deblocked images and motion compensated blocks retrieved from the single memory system, and final motion estimation results received from the final motion estimation stage, creating temporally filtered images.

13. The system of claim 12 wherein the de-interlacer performs de-interlacing on the temporally filtered images and the motion compensated blocks, and the final motion estimation results received from the final motion estimation stage, creating de-interlaced images, which are written back to the single memory system.

14. The system of claim 13 wherein the de-interlacing is performed in a display channel.

15. The system of claim 14 wherein aspect ratio conversion is performed during the de-interlacing filtering stage.

16. The system of claim 14 wherein the aspect ratio conversion is performed up to a high-definition (HD) standard from standard definition.

17. An integrated decoding system, comprising:
   a video decoder for decompressing an input data stream;
   an integrated post-processing stage coupled to the video decoder, the integrated post-processing stage comprising,
      a scene classifier,
      a temporal filter, and
      de-interlacer; and
   a single memory system used by the video decoder and the integrated post-processing stage for storing, retrieving, and processing images from the input data stream.

18. The system of claim 17 wherein the integrated post-processing stage further includes a deblocking filter.

19. The system of claim 18 wherein the scene classifier is coupled to the temporal filter for detecting scene changes and adapting strength of the temporal filter accordingly.

20. The system of claim 19 wherein the scene classifier is further coupled to the de-interlacer.

21. The system of claim 20 wherein the integrated post-processor further includes a single motion compensation stage such that the temporal filter and the de-interlacer are motion compensated.

22. The system of claim 21 wherein the post-processor includes an integrated process that first retrieves reference image motion compensated blocks from the single memory system, and then decodes, deblocks, scales, decimates and performs spatial analysis.

23. The system of claim 22 wherein the integrated process also performs progressive content detection for motion estimation, temporal filtering, and deinterlacing, and writes processed images then written back to the single memory system.

24. The system of claim 23 wherein decimated images are transferred to a motion estimation storage.

25. The system of claim 24 wherein the decimated images and reference image motion compensated blocks are retrieved from the motion estimation storage for preliminary hierarchical motion estimation.

26. The system of claim 25 wherein a final motion estimation stage performs final motion estimation using deblocked images and motion compensated blocks retrieved from the single memory system, and motion estimation results received from the preliminary hierarchical motion estimation.

27. The system of claim 26 wherein the temporal filter performs temporal filtering using the deblocked images and motion compensated blocks retrieved from the single memory system, and final motion estimation results received from the final motion estimation stage, creating temporally filtered images.

28. The system of claim 27 wherein the de-interlacer performs de-interlacing on the temporally filtered images and the motion compensated blocks, and the final motion estimation results received from the final motion estimation stage, creating de-interlaced images, which are written back to the single memory system.

29. The system of claim 28 wherein motion-compensated de-interlacing filtering stage is performed in the video display channel.

30. The system of claim 28 wherein the post-processing stage further integrates format conversion and scaling functions.

31. The system of claim 30 wherein the format conversion comprises conversion between a 525/50 standard and a 625/50, and is performed after MCTF and MCDI.

* * * * *